United States Patent
Jiang et al.

(10) Patent No.: US 8,773,542 B2
(45) Date of Patent: Jul. 8, 2014

(54) APPARATUS AND METHOD FOR ADAPTIVE CAMERA CONTROL METHOD BASED ON PREDICTED TRAJECTORY

(75) Inventors: Ming Jiang, Santa Clara, CA (US); Ruifeng Xu, San Jose, CA (US); Bartley Calder, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 13/473,865

(22) Filed: May 17, 2012

(65) Prior Publication Data

US 2013/0308002 A1    Nov. 21, 2013

(51) Int. Cl.
*H04N 5/228*    (2006.01)

(52) U.S. Cl.
USPC ............................................. 348/208.6

(58) Field of Classification Search
CPC ................................................. H04N 5/23248
USPC ............................................. 348/208.1–208.6
See application file for complete search history.

(56) References Cited

U.S. PATENT DOCUMENTS

| | | | | |
|---|---|---|---|---|
| 8,279,291 | B2 * | 10/2012 | Ooishi | 348/208.6 |
| 2009/0290809 | A1 * | 11/2009 | Yamada | 382/266 |
| 2011/0105181 | A1 * | 5/2011 | McLeod | 348/208.5 |
| 2012/0120264 | A1 * | 5/2012 | Lee et al. | 348/208.4 |

* cited by examiner

*Primary Examiner* — Gevell Selby
(74) *Attorney, Agent, or Firm* — Jefferson IP Law, LLP

(57) ABSTRACT

An apparatus and method for adaptive camera control are provided. The method includes detecting motion information of a camera, predicting a motion of the camera based on the motion information, generating camera settings for controlling the camera, based on the predicted motion, controlling the camera to capture a frame according to the camera settings, performing digital image stabilizing on the captured frame, and outputting the stabilized frame.

18 Claims, 3 Drawing Sheets

APPARATUS AND METHOD FOR ADAPTIVE CAMERA CONTROL METHOD BASED ON PREDICTED TRAJECTORY

BACKGROUND OF THE INVENTION

1. Field of the Invention

The present invention relates to an apparatus and method for adaptive camera control. More particularly, the present invention relates to an apparatus and method for adaptive camera control to stabilize an image according to a predicted trajectory.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Many mobile terminals now offer a video-recording feature using a built-in camera. However, because the mobile terminals are typically hand-held, the resulting video tends to be jerky or blurry due to the movement of the user's hands while recording. In many cases, either interesting information is lost or not enough information is captured for post-processing to compensate for this motion. The techniques for addressing this issue are referred to as image stabilization.

Image stabilization techniques typically fall into two categories: optical stabilization and digital stabilization. In optical stabilization, the lens or the image sensor is moved to counter the movement of the camera. Since this requires a physical element to move the lens or the image sensor, optical stabilization is generally found on higher-end or expensive cameras.

Digital image stabilization shifts the image in post-processing to counter the movement of the camera when the video was captured. Digital image stabilization employs pixels outside the border of the visible frame to provide a buffer for the motion. This technique reduces distracting vibrations from videos or improves still image quality by allowing the user to increase the exposure time without blurring the image. This technique does not affect the noise level of the image, except in the extreme borders when the image is extrapolated.

On most cameras, no extra pixels are captured outside of the border of the visible frame. As a result, frames have to be cropped to remove uneven borders in order to align frames. Moreover, cameras typically capture frames at a fixed frame rate without respect to the motion of the camera. When the camera moves, the slow frame rate may cause the loss of interesting information.

Another issue with consumer cameras commonly seen on mobile devices is the real-time response. The camera settings may require a relatively long time to take effect. Moreover, the motion information extracted from consecutive image frames is very limited. For example, the motion information normally has no concept of acceleration and trajectory. Due to the limited information provided by "motion vectors", the effectiveness of the image stabilization is limited.

Accordingly, there is a need for an apparatus and method for providing improved digital image stabilization.

SUMMARY OF THE INVENTION

Aspects of the present invention are to address at least the above-mentioned problems and/or disadvantages and to provide at least the advantages described below. Accordingly, an aspect of the present invention is to provide an apparatus and method for adaptive camera control based on a predicted camera trajectory.

In accordance with an aspect of the present invention, a method for adaptive camera control is provided. The method includes detecting motion information of a camera, predicting a motion of the camera based on the motion information, generating camera settings for controlling the camera, based on the predicted motion, controlling the camera to capture a frame according to the camera settings, performing digital image stabilizing on the captured frame, and outputting the stabilized frame.

In accordance with another aspect of the present invention, a terminal is provided. The terminal includes a camera for capturing a plurality of frames of video, a motion sensor for detecting a motion of the camera and for generating motion information according to the detected motion, a motion prediction unit for generating a predicted motion of the camera based on the motion information and for generating camera settings to control the camera based on the predicted motion, a post-processing unit for performing digital image stabilization on the plurality of frames captured by the camera and for outputting video based on the stabilized frames, and a controller for controlling the camera according to the camera settings generated by the motion prediction unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for adaptive camera control. A terminal supporting a camera function may employ a predictive algorithm to predict the movement of the camera based on input from a motion sensor. The camera settings derived from the predictive algorithm may be used to determine how the camera captures the image and how the image is processed during the post-processing stage.

Figure 1:
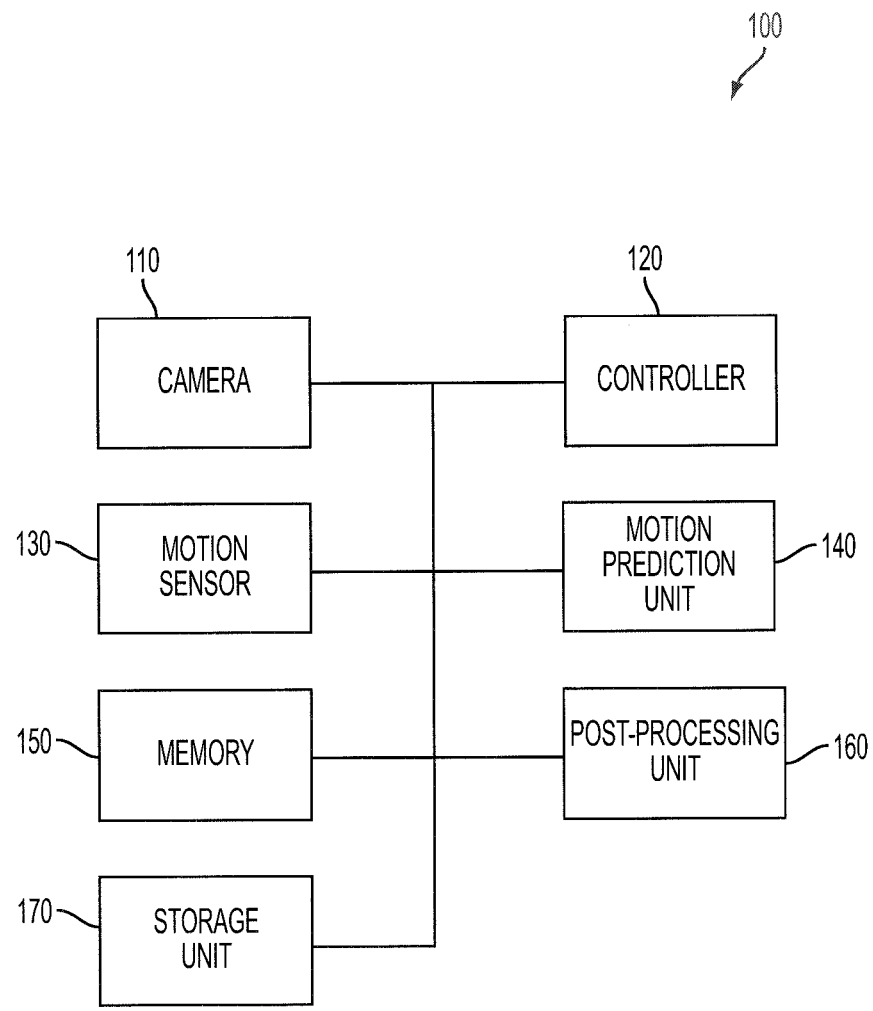
FIG. 1 is a diagram of a terminal according to an exemplary embodiment of the present invention.

FIG. 1 is a diagram of a terminal according to an exemplary embodiment of the present invention.

Referring to FIG. 1, the terminal 100 includes a camera 110, a controller 120, a motion sensor 130, a motion prediction unit 140, a memory 150, a post-processing unit 160, and a storage unit 170. Depending on the design and purpose of the terminal 100, the terminal 100 may include additional units not shown here. For example, if the terminal 100 is a cellular phone or smart phone, the terminal 100 may include a communication unit, an input unit, and a display unit. Similarly, one or more of the above units may be integrated into a single component.

The terminal 100 may be any device capable of supporting a camera function. In addition to a dedicated camera, the terminal 100 may be a smartphone, Personal Digital Assistant, tablet, or the like.

The controller 120 controls overall operations of the terminal 100. In particular, the controller 120 controls the motion prediction unit 140 to generate camera settings based on movements detected by the motion sensor 130. The controller 120 controls the camera 110 to capture an image according to the camera settings generated by the motion prediction unit 140, as described below. The raw images generated by the camera 110 are then post-processed by the post-processing unit 160 to stabilize the image. For units implemented entirely or partially as software code, the code in these units may be executed by the controller 120.

The motion sensor 130 detects the motion of the camera 110, and generates motion information which is used by the motion prediction unit 140 to generate the camera settings. The motion sensor 130 may include any sensor capable of detecting the motion of the terminal 100. For example, the motion sensor 130 may include a gyroscope, accelerometer, and the like.

The memory 150 may include a buffer for storing the raw video during post-processing. The memory 150 may be, for example, a flash memory or Random Access Memory (RAM).

The storage unit 170 stores data and program used for operating the terminal 100. The data may include the video processed by the post-processing unit 160. When the post-processing unit 160 and the motion prediction unit 140 are implemented as software, the post-processing unit 160 and motion prediction unit 140 may be stored in the storage unit 170.

The motion prediction unit 140 receives the motion information from the motion sensor 130 and predicts the movement of the camera 110 based on the received information. This prediction may include calculating an acceleration/deceleration of the camera 110 according to the received motion information and/or determining a velocity of the terminal 100 according to the calculated acceleration. The motion prediction unit 140 may use this information to predict the motion and/or position of the terminal 100 (and, by extension, the camera 110) when the camera 110 captures a future frame.

Based on the calculated predictions, the motion prediction unit 140 generates camera settings for the camera 110. As described above, these camera settings may reflect a predicted movement of the camera 110 in a future frame. The camera 110 captures an image according to these settings. For example, the camera 110 may zoom out adaptively according to the predicted movement of the camera 110 as determined by the motion prediction unit 140. The post-processing unit 160 may then use the additional image captured by the camera 110 as a result of zooming out in the post-processing digital stabilization of the image. The camera settings may include shutter speed, sensitivity, white balance, zoom factor, and time to shoot.

The post-processing unit 160 performs post-processing on the raw video generated by the camera 110. The post-processing unit 160 may employ any digital image stabilization technique to compensate for the motion of the camera 110. For example, the post-processing unit 160 may shift each frame of the video to compensate for the motion of the camera 110 as predicted by the motion prediction unit 140 and/or the actual motion of the camera 110 when the frame was captured.

Digital image stabilization according to the related art does not rely on predicting the motion of the camera 110. These techniques typically determine the motion of the camera 110 based on motion information derived from an analysis of consecutive frames. The motion information thus reflects the past motion of the camera 110, not the future motion of the camera 110 when subsequent frames are captured. Moreover, this analysis often cannot derive an acceleration or trajectory of the camera 110. Because the camera 110 does not know the trajectory of the camera 110, the camera 110 cannot anticipate the movements of the camera 110 and make adjustments.

In the post-processing stage, the post-processing unit 160 shifts the captured frame to compensate for the movement of the camera 110. However, as a result of the shifting, the shifted frame may include a region which was not captured by the camera 110 or otherwise cannot be displayed. The frame should be cropped to exclude these regions. In contrast, according to an exemplary embodiment of the present invention, because the camera 110 took into account the predicted motion, more of the frame may be captured, and the post-processing unit 160 may preserve more information during the post-processing stage. Exemplary methods are described below with respect to FIGS. 2 and 3.

Figure 2:
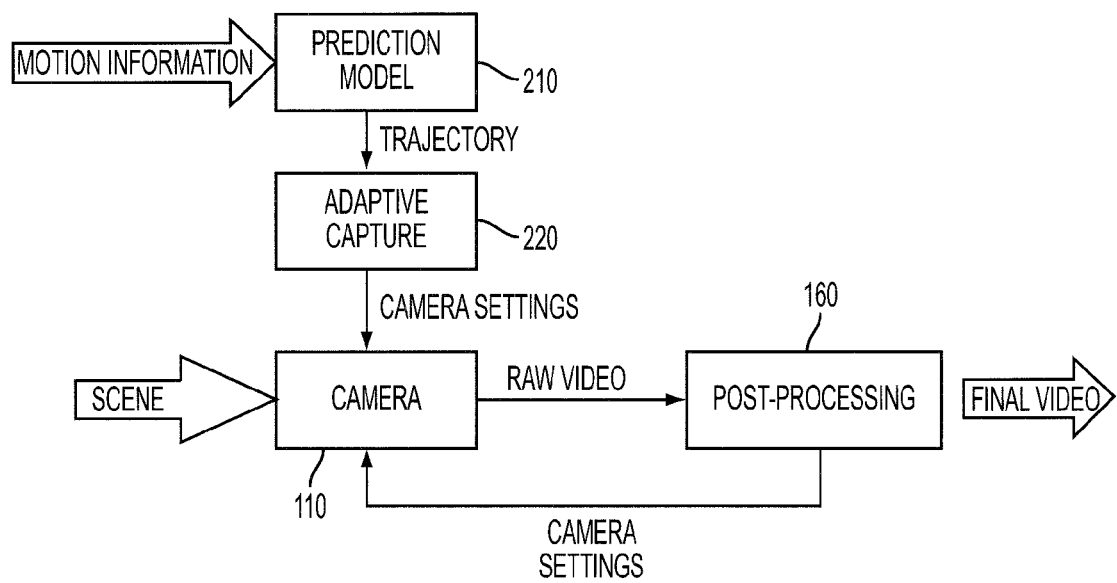
FIG. 2 is an overview of an adaptive camera control process according to an exemplary embodiment of the present invention.

FIG. 2 is an overview of an adaptive camera control process according to an exemplary embodiment of the present invention.

Referring to FIG. 2, motion information generated by the motion sensor 130 is input to a prediction model 210, which generates trajectory information used by an adaptive capture algorithm 220. The prediction model 210 and the adaptive capture algorithm 220 may be executed by the motion prediction unit 140. The prediction model 210 receives the motion information and predicts the movement of the camera 110. This may include determining an acceleration and velocity of the camera 110 according to the received motion information and generating a predicted trajectory based on the acceleration and velocity.

Any statistical model may be employed as the prediction model 210. For example, the prediction model 210 may be an AutoRegressive Moving Average (ARMA) model, taking the motion information as sample points. To improve the accuracy of the model, multiple types of data may be input to the prediction model 210. For example, in addition to acceleration and velocity samples, position and orientation information may also be input to the prediction model 210. Similarly, the velocity may include rotational velocity and translational velocity.

In addition, the prediction model 210 may also take into account errors in previous predictions. For example, the prediction model 210 may predict a certain trajectory and position of the camera 110 at a future time t1. When t1 arrives, the prediction model 210 may determine the actual trajectory and position of the camera 110 at time t1, and determine a prediction error based on the difference between the predicted values and the actual values. The prediction error may also take into account motion information obtained from an analysis of consecutive frames during the post-processing. The prediction error may be fed back into the prediction model 210 to improve future predictions.

The trajectory information calculated by the prediction model 210 is input to an adaptive capture algorithm 220. The adaptive capture algorithm 220 determines camera settings for the camera 110 according to the received trajectory information. For example, the adaptive capture algorithm 220 may determine that the camera 110 should zoom out in order to capture a larger scene, allowing more information to be preserved after post-processing. The decision to zoom out may then be reflected in the camera settings input to the camera 110.

Other camera settings may also be determined according to the predicted trajectory or other motion information. For example, if the trajectory indicates a high rate of acceleration, the adaptive capture algorithm 220 may determine that the camera 110 should capture frames at a higher frame rate, preserving greater motion information during these periods. If the camera 110 cannot capture the frame at a higher frame rate, the camera settings may reflect a lower camera resolution to allow the camera 110 to capture frames at the higher rate.

The camera settings are input to the camera 110, and the camera 110 captures frames according to the input settings. If the settings indicate that the camera 110 should zoom out, the camera 110 will zoom out to capture a larger scene.

The raw video generated by the camera 110 is input to the post-processing unit 160. The post-processing unit 160 processes the raw video and performs digital image stabilization on the raw video. The post-processing unit 160 may perform any digital image stabilization on the raw video to compensate for the motion of the camera 110. However, because the camera 110 captured more information based on the predicted movement, the post-processing unit 160 is able to preserve more information in the stabilized frame.

The post-processing unit 160 outputs the final video, which has undergone digital image stabilization to the memory 150 or the storage unit 170, depending on the nature of the terminal 100 or user settings. In addition, as described above, the post-processing unit 160 may feed back to the camera 110 or the prediction model 210 information derived from an analysis of consecutive frames.

Figure 3:
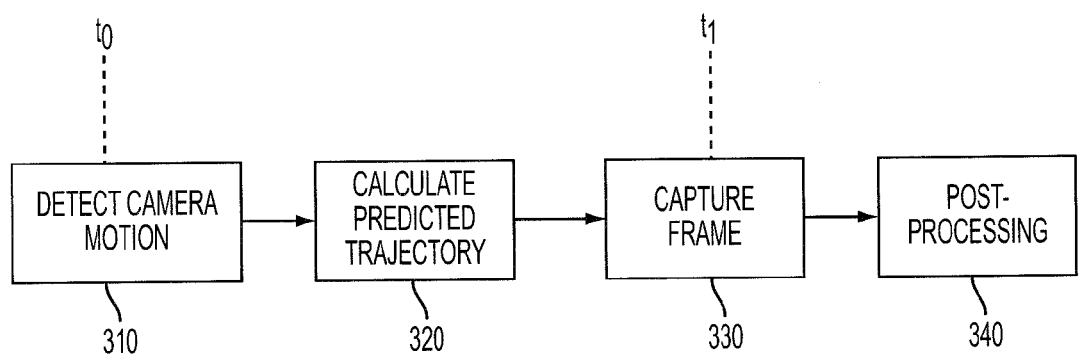
FIG. 3 is a flowchart of a method for adaptively controlling a camera according to an exemplary embodiment of the present invention.

FIG. 3 is a flowchart of a method for adaptively controlling a camera according to an exemplary embodiment of the present invention.

Referring to FIG. 3, the motion prediction unit 140 receives motion information from the motion sensor 130 in step 310. The motion information reflects the motion of the camera 110 at time $t_0$. The motion information may include a velocity or an acceleration of the terminal 100.

In step 320, the motion prediction unit 140 generates a predicted trajectory of the camera 110 at time $t_1$ based on the motion information received from the motion sensor 130. The predicted trajectory reflects the predicted motion of the camera 110 at time $t_1$. For example, based on the motion information, the motion prediction unit 140 may determine that the camera 110 will be moving upward at time $t_1$. The motion prediction unit 140 generates camera settings based on the predicted trajectory and transmits the camera settings to the camera 110.

The time $t_1$ may represent a lag time reflecting the time between when the controller 120 receives the camera settings and when the controller 120 to apply the camera settings to the camera 110. This lag may be relatively large.

In step 330, at time $t_1$ the controller 120 controls the camera 110 to capture the image according to the camera settings received from the motion prediction unit 140. These camera settings may instruct the camera 110 to zoom out or adjust a frame capture rate. For example, if the motion prediction unit 140 determines that the camera 110 is accelerating, the motion prediction unit 140 may anticipate the motion of the camera 110 at time $t_1$ (when the camera settings are actually applied by the controller 120) and instruct the camera 110 to zoom out in order to capture a larger screen area at time $t_1$. The raw video generated by the camera 110 may be stored in a buffer of the memory 150.

In step 340, the post-processing unit 160 performs post-processing on the raw video generated by the camera 110. The post-processing includes performing digital image stabilization on the raw video. As described above, digital image stabilization includes shifting each frame of the raw video to compensate for the movement of the camera 110 and cropping the frame where needed. However, because the camera 110 adjusted its capturing in accordance with the camera settings generated by the motion prediction unit 140, the post-processing unit 160 may preserve more of the frame in the stabilization process. The final video processed by the post-processor may be output to the storage unit 170 or the memory 150.

In contrast to the method described above, according to the related art, motion information obtained at time $t_0$ (e.g., by analysis of frames captured at time $t_0$) is used to control camera settings at time $t_1$. Accordingly, the camera settings may not reflect the actual motion of the camera 110 at time $t_1$. While digital image stabilization may still be performed on the captured frames, more information will be lost to the stabilization procedure as compared to the method according to an exemplary embodiment of the present invention.

According to exemplary embodiments of the present invention as described above, by predicting the motion of a camera, the camera may capture more information about a scene, allowing the digital image stabilization process to preserve more of the captured image while maintaining relatively stable video.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for adaptive camera control, the method comprising:
   detecting motion information of a camera;
   predicting a motion of the camera based on the motion information;
   generating camera settings for controlling the camera, based on the predicted motion;
   controlling the camera to capture a frame according to the camera settings;
   performing digital image stabilizing on the captured frame; and
   outputting the stabilized frame,
   wherein the predicting of the motion of the camera comprises predicting the motion of the camera according to a prediction model.

2. The method of claim 1, wherein the motion information comprises an acceleration of the camera.

3. The method of claim 1, wherein the motion information comprises a velocity of the camera.

4. The method of claim 1, wherein the camera settings specify at least one of a zoom factor, shutter speed, sensitivity, white balance, and frame rate.

5. The method of claim 1, wherein the motion information includes information derived from consecutive previously captured frames.

6. The method of claim 1, wherein the predicting of the motion of the camera comprises:
   predicting the motion of the camera based on the motion information;
   determining an actual motion of the camera;
   comparing the actual motion of the camera with the predicted motion;
   generating a prediction error according to a result of the comparison; and
   updating the predicted motion based on the motion information and the prediction error.

7. The method of claim 1, wherein the predicted motion of the camera comprises a predicted trajectory of the camera.

8. The method of claim 1, wherein the prediction model is an AutoRegressive Moving Average (ARMA) model.

9. A terminal, comprising:
   a camera for capturing a plurality of frames of video;
   a motion sensor for detecting a motion of the camera and for generating motion information according to the detected motion;
   a motion prediction unit for generating a predicted motion of the camera based on the motion information and for generating camera settings to control the camera based on the predicted motion;
   a post-processing unit for performing digital image stabilization on the plurality of frames captured by the camera and for outputting video based on the stabilized frames; and
   a controller for controlling the camera according to the camera settings generated by the motion prediction unit,
   wherein the motion prediction unit employs a prediction model.

10. The terminal of claim 9, further comprising:
    a storage unit for storing the video output from the post-processing unit.

11. The terminal of claim 9, further comprising:
    a memory for buffering the plurality of frames captured by the camera.

12. The terminal of claim 9, wherein the motion sensor comprises an accelerometer, and
    wherein the motion prediction unit determines an acceleration of the camera according to motion information generated by the accelerometer, and generates the predicted motion based on the determined acceleration.

13. The terminal of claim 9, wherein the camera settings specify at least one of a zoom factor, shutter speed, sensitivity, white balance, and frame rate.

14. The terminal of claim 9, wherein the motion sensor comprises a gyroscope.

15. The terminal of claim 9, wherein the motion prediction unit predicts a trajectory of the camera.

16. The terminal of claim 9, wherein the motion prediction unit determines the predicted motion of the terminal and an actual motion of the terminal, generates a prediction error based on a comparison of the predicted motion and the actual motion, and updates the predicted motion according to a result of the comparison.

17. The terminal of claim 9, wherein the post-processing unit obtains motion information from previously captured consecutive frames and provides the obtained motion information to the motion prediction unit.

18. The terminal of claim 9, wherein the prediction model is an AutoRegressive Moving Average (ARMA) model.

* * * * *